2,858,238
STABLE COMPLETELY OXIDIZED MACROMOLECULAR COMPOSITION

George E. Brown, Jr., Glendale, Ohio

No Drawing. Application April 26, 1955
Serial No. 504,090

15 Claims. (Cl. 117—164)

This invention relates to a stable, completely oxidized, macromolecular composition obtained from a neutralization reaction between oxidized and reduced forms of protein degradation products in the peptonepolypeptide range, and it particularly pertains to a composition for impregnating or coating felted or woven fibrous sheets, such as paper and the like. Fibrous sheets treated with the novel composition are increased in tensile strength, and are rendered fire and water-resistant as well as being non-reactive to the weak acids and bases. The treated fibrous sheets may be used alone or laminated together.

The reaction produces a continuous molecular latticework of coordinate, covalent bonds between the oxidized nitro groupings and the reduced amino groupings of the peptide structure of the protein, resulting in the formation of one continuous molecule from the reactants with the elimination of one molecule of water, so that a completely oxided macromolecular structure is obtained.

Heretofore, proteins have not been of a completely oxidized macromolecular structure, and accordingly, fibrous sheets treated with proteins have limited uses. Proteins, such as casein, have been generally used for treating fibrous sheets, and some preservative has been incorporated therein, such as phenol, chrome alum, thymol or formaldehyde, and usually with the addition of some alkali, such as soda ash, borax or ammonia, to render the casein water-insoluble if not of such character.

The protein materials heretofore used have not been completely oxidized to a completely macromolecular structure, and, consequently, not of a character to resist reaction with reducing material coming in contact therewith. Hence, any protection against such reducing material was obtained only if the preservatives should be of a character to provide such resistance to the reducing material. However, the primary purpose of the preservative was to preserve the protein against decomposition, and any protection that the preservative might give, if any, against the reducing material, was purely accidental.

Accordingly, one of the main objects of the invention is the production of a completely oxidized protein of macromolecular structure.

Another object of the invention is a completely oxidized protein of macromolecular structure which is non-reactive with a reducing agent except those which are very powerful in character.

Another object of the invention is a neutralization reaction between oxidized and reduced forms of protein degradation products.

Another object of the invention is a protein of novel character for treating fibrous products.

Still another object of the invention is a protein treated fibrous product which is economically made.

The invention is typified by neutralizing an oxidized commercially pure protein, such as soya, cottonseed, casein, gelatin or such, with the same or a different protein which is reduced, and reacting them to produce a continuous molecular lattice-work of coordinate, covalent bonds between the oxidized nitro groupings and the reduced amino groupings of the peptide structure of the protein, resulting in the formation of a continuous chain molecule with the elimination of one molecule of water. There is a nitrogen-nitrogen bonding which produces a relatively stable arrangement.

One specific manner for carrying out the invention is to prepare two solutions which, for convenience, are referred to as A and B.

Solution A is prepared by taking about (by weight) sixty percent (60%) of commercially pure protein, such as soya, cottonseed, casein, gelatin, or other protein, and forty percent (40%) water which is preferably preheated to about eighty degrees (80°) F. These are mixed to a smooth mucilaginous consistency. The mixed mass is heated to about 150° F., during or after which about five percent (5%) of a reducing agent (by weight) is added, said reducing agent being typified by a saturated stannous chloride solution. Any other equally strong or stronger reducing agent may be used that is not detrimental to the user of the finished products. The mixture is allowed to cool.

Solution B is prepared by taking (by weight) sixty percent (60%) of commercially pure protein and forty percent (40%) water as in solution A, likewise heated to about eighty (80°) degrees F. and mixed to a smooth mucilaginous consistency. To this mixture is added (by weight) about three percent (3%) of an oxidizing agent, such as hydrogen peroxide. The oxidizing agent is preferably one as strong as hydrogen peroxide and may be stronger. This mixture is heated to about one hundred and seventy-five (175°) degrees F. for about sixty (60) minutes, then cooled and filtered through a 100 mesh screen.

Fibrous products, such as untreated cellulose mats are first impregnated, preferably saturated, with solution A, in any conventional manner, and partially dried in an inert atmosphere, such as nitrogen or carbon dioxide. The treated mat is then coated over on one or both of its opposite surfaces with solution B and partially dried. The coating is treated with a saturated calcium hydroxide solution, and sprayed lightly with one (1) normal hydrochloric acid, after which the treated coated material is partially dried, washed with running water, and then completely dried in any conventional manner such as with a steam roller. These two solutions react with the macromolecule into a base-protein-acid compound which is stable in physical character to resist the action of water, various salts, acids and alkalis. There is not merely a mixture of the components of the solution but they are reacted as a chemical unit with all the water content held in combined form and none of it "free."

Alternately, a fibrous mat can be treated with solution A, and sandwiched between two fibrous mats treated with solution B. A laminated structure of any desired thickness can be built up with the mat, impregnated with the different solutions in alternation but with the mats treated with solution B comprising the outermost layer. Any excess liquid or moisture can be removed, as by suction, after which the laminated construction is dried. The resultant product can be worked the same as wood by being planed, sawed, drilled, shaped, and the like. Unlike wood, however, it is waterproof and will neither swell nor warp.

The material can be applied as a coating to wood, plaster, concrete, metal, just by applying solution A to the surface to be coated, and then overlaying the treated surface with solution B.

The essential components of solutions A and B are those set forth above, but other components may be included to give specific characteristics. For example, barium sulphate may be included in either or both of the solutions as a whitening agent. A thickener or filler, such as tapioca, may be included to give a smoother finish, and various coloring pigments may be included.

Another alternative is in mixing solutions A and B together with discrete particles incorporated therein to be bonded together in a surface coating or a sheet formed from the composition. The solution is particularly adapted for binding such discrete particles as finely powdered mica, clay, wood flour and any other finely divided solid filling material. While the solutions A and B may be preponderant or subordinate in proportion to the filling material, it has been found that a subordinate proportion is sufficient to bond the discrete solid particles into sheet form which is predominantly and essentially of the character of the solid filling material which is incorporated into the solution. The composition is fabricated into sheet form in any suitable manner.

It will be understood that there may be various changes in details of construction without departing from the spirit of the invention, and, therefore, the invention is claimed broadly as indicated by the appended claims.

Having thus described my invention, what I claim as new and useful and desire to secure by United States Letters Patent is:

1. A composition of a macromolecular structure obtained by a neutralization reaction between oxidized nitro groupings of and reduced amino groupings of the peptide structure of protein products in the pentone-polypeptide range.

2. A protein composition of a macromolecular structure comprising a layer of reduced protein products overlaid with oxidized protein degradation product and having a neutralization reaction therewith.

3. The protein composition of claim 2 in which the neutralization reaction composite is held stabilized.

4. A composition of a macromolecular structure obtained by a neutralization reaction between an oxidized solution of about sixty percent (60%) protein and forty percent (40%) water and a solution of about sixty percent (60%) reduced protein product and forty percent (40%) water.

5. The composition of claim 4 having intimately mixed therein finely divided solid filling material.

6. The composition of claim 5 in which the finely divided solid filling material preponderates in proportion to give said composition the general character of said filling material.

7. The method of coating articles comprising applying to an article to be coated a layer of reduced amino groupings of the peptide structure of a protein product, superimposing a layer of oxidized nitro groupings of the peptide structure of protein product over the first layer, and the layers to react by a neutralization reaction between them.

8. The method of claim 7 in which the layers are treated first with an hydroxide solution, and then with an acid to hold the reacted product stabilized.

9. The method of claim 8 in which the hydroxide solution is saturated calcium hydroxide, and the acid is hydrochloric acid.

10. A method of forming a neutralization reaction composition comprising mixing a solution of about sixty percent (60%) protein degradation product and forty percent (40%) water with an oxidizable solution of about sixty percent (60%) protein and forty percent (40%) water, and drying the mixed mass with the protein components reacted into a macromolecular structure.

11. The method of claim 10 in which finely divided solid filling material is included in the mixture, and the mixture is made into sheet form.

12. A method of forming a neutralization reaction composition comprising mixing a solution of protein degradation product with an oxidizable solution of protein, and drying the mixed mass with the protein components reacted into a macromolecular structure.

13. The method of claim 12 in which finely divided solid filling material is incorporated in the mixture, and the mixture is sheeted.

14. A method of forming a neutralization reaction composition comprising treating a product with an aqueous solution of reduced protein, applying to protein treated product an oxidizable aqueous solution of protein, and drying the protein solutions for combining the proteins into a macromolecular structure.

15. A method of forming a neutralization reaction composition comprising forming an aqueous solution of reduced protein and an oxidized protein, and removing the aqueous content for causing the protein components to react into a macromolecular structure.

References Cited in the file of this patent

UNITED STATES PATENTS 2,691,582    Lowe et al. _____ Oct. 12, 1954

OTHER REFERENCES

Chemical Review, vol. 41, No. 1, August 1947, 260–112.

Simha: Archives of Biochem. and Biophysics, vol. 45. (Copy in Scientific Library.)